(12) United States Patent
Dillon

(10) Patent No.: US 9,044,999 B2
(45) Date of Patent: Jun. 2, 2015

(54) METHOD AND APPARATUS FOR MOUNTING AND DEMOUNTING LARGE WHEELS

(71) Applicant: Ben N. Dillon, Columbus, OH (US)

(72) Inventor: Ben N. Dillon, Columbus, OH (US)

(73) Assignee: Tribine Industries, LLC, Logansport, IN (US)

( * ) Notice: Subject to any disclaimer, the term of this patent is extended or adjusted under 35 U.S.C. 154(b) by 257 days.

(21) Appl. No.: 13/908,045

(22) Filed: Jun. 3, 2013

(65) Prior Publication Data
US 2014/0352133 A1    Dec. 4, 2014

(51) Int. Cl.
| B60B 29/00 | (2006.01) |
| B60B 30/08 | (2006.01) |
| B62D 65/12 | (2006.01) |
| B23P 6/00  | (2006.01) |
| B23P 19/10 | (2006.01) |
| B25B 11/00 | (2006.01) |

(52) U.S. Cl.
CPC ......... B60B 29/001 (2013.01); *Y10T 29/49963* (2015.01); *B23P 6/00* (2013.01); *B23P 19/10* (2013.01); *B25B 11/00* (2013.01); B60B 30/08 (2013.01); *B60B 2340/32* (2013.01); *B60B 2340/34* (2013.01); *B60B 2340/50* (2013.01); *B62D 65/12* (2013.01); *Y10T 29/49718* (2015.01); *Y10T 29/49998* (2015.01); *B60B 2900/113* (2013.01); *B60Y 2200/221* (2013.01)

(58) Field of Classification Search
CPC ............ B23P 6/00; B23P 11/00; B23P 19/00; B23P 19/04; B23P 19/10; B25B 11/00; B25B 11/02; B60B 29/00; B60B 29/001; B60B 30/00; B60B 30/02; B60B 30/06; B60B 30/08; B60B 2340/30; B60B 2340/32; B60B 2340/50; B60B 2340/52; B60B 2340/34; B62D 65/12; Y10T 29/49718; Y10T 29/4973; Y10T 29/49895; Y10T 29/49963; Y10T 29/49998
See application file for complete search history.

(56) References Cited

U.S. PATENT DOCUMENTS

| 4,532,689 | A  | * | 8/1985  | Harder et al. ............... 29/426.5 |
| 4,684,310 | A  | * | 8/1987  | Stange .......................... 414/427 |
| 4,920,628 | A  | * | 5/1990  | Gennodie et al. .......... 29/402.08 |
| 5,143,507 | A  | * | 9/1992  | Haugen et al. ................ 414/427 |
| 5,426,841 | A  | * | 6/1995  | Peterson ...................... 29/426.3 |
| 5,618,228 | A  | * | 4/1997  | Anderson ..................... 451/403 |
| 6,237,206 | B1 | * | 5/2001  | Bezemer et al. ................ 29/273 |
| 2009/0283345 | A1 | * | 11/2009 | Kabrick et al. ............ 180/65.51 |

* cited by examiner

*Primary Examiner* — Alexander P Taousakis
*Assistant Examiner* — Matthew P Travers
(74) *Attorney, Agent, or Firm* — Mueller Law, LLC; Jerry K. Mueller, Jr.

(57) ABSTRACT

Disclosed is an elongate arbor for mounting a wheel or wheel/tire combination onto an axle of a vehicle. One of the axle hub or the wheel bears threaded studs and the other bears tapped holes. The elongate arbor is terminated at one end with elongate fork tubes and at the opposite end with a flange having a plurality of apertures, says 3 apertures. The wheel to be mounted has tapped holes created to match the arbor flange apertures for mounting the wheel onto the arbor with threaded studs. Forks from, for example, a forklift, can be inserted into the elongate forklift tubes to lift and maneuver the arbor/wheel combination to align the wheel mounts with the axle mounts and threaded studs inserted for securement. The large wheel now can be mounted to axle hub of the vehicle.

15 Claims, 4 Drawing Sheets

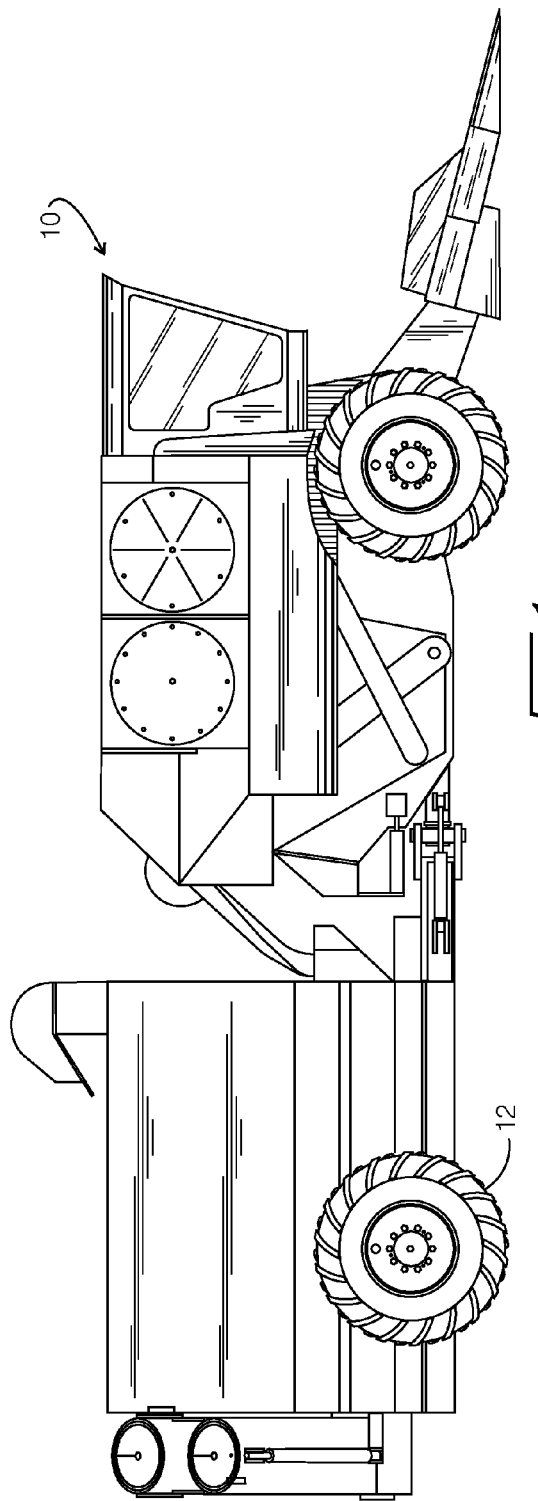
FIG. 1
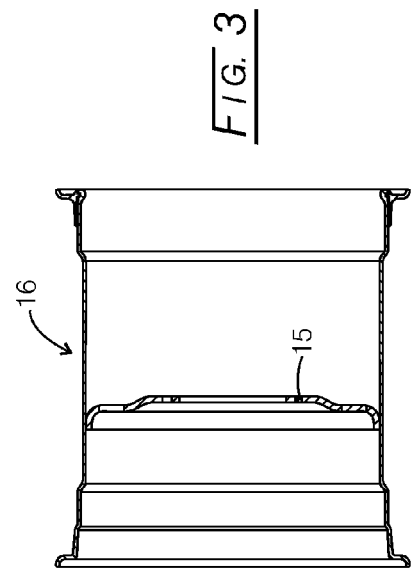
FIG. 2
FIG. 3

METHOD AND APPARATUS FOR MOUNTING AND DEMOUNTING LARGE WHEELS

CROSS-REFERENCE TO RELATED APPLICATIONS

None.

STATEMENT REGARDING FEDERALLY SPONSORED RESEARCH

Not applicable.

BACKGROUND

The present disclosure relates to mounting and dismount vehicle wheels and more particular to mounting and dismounting vehicle large wheels.

Mounting and removing large wheel/tire combinations from mobile machinery, such as, for example, tractors or combines, is a difficult and somewhat dangerous process. The wheels with tires mounted on them are unstable in the vertical position in which they must be mounted. They can roll or fall over. They are frequently transported in the horizontal position. They must be upended and held in the vertical position for mounting onto the axle hub of the machine.

This is most frequently done with a chain or sling lifted by a truck mounted boom crane or forklift. The chain or sling usually does not hold the wheel in a steady, straight vertical position to start lug studs into the threads on the machine hub. Chains or slings suspended from an overhead lifting device also can interfere with bodywork, such as, for example, fenders or other parts of the vehicle or machine.

Scissors type tire gripper lifting mechanisms have been used and are generally an improvement over just a chain, but they are usually suspended by a chain and do not necessarily hold the wheel/tire in an upright vertical position. Wheels generally are attached to the periphery of the axle hub by a circle of threaded studs. A typical number on large machines is ten. These studs must be inserted in mating alignment holes to mount the wheel and the wheel moved from such threaded studs in order to safely remove or dismount the wheel. The wheel generally has clearance mounting holes and the hub is drilled and tapped to secure the studs and, therefore, the wheel.

BRIEF SUMMARY

The improvement is to intersperse a plurality, such as three, drilled and tapped holes in the wheel circle of clearance mounting holes. These holes provide a method for securing an elongated arbor or flange with spokes firmly to the wheel such that it can be completely controlled in a vertical position and aligned for inserting the mounting studs. The alignment process can be made easier by inserting two tapered pins temporarily into mounting stud holes more than 90 degrees apart in the axle hub. The arbor is free to rotate so the mounting stud holes come into satisfactory alignment as the wheel is pushed onto the tapered alignment pins. Tapered alignment pins have been used but a chain, sling or scissors suspension works against their force. The arbor which holds the wheel straight vertically and is free to rotate works in concert with the alignment pins to facilitate insertion of the mounting studs.

The system works equally well with axle hubs that have protruding studs mounted in them and the wheel is secured by nuts on the outside surface of the wheel. The system also could work with drilled and tapped holes in a pattern or diameter other than the mounting lug bolt circle; however, in many cases of wheel designs, this lug bolt circle is the only suitable flat surface for drilled and tapped holes. The arbor may be attached to and lifted by various devices, such as, for example, a forklift boom or the forks on a backhoe, tractor loader, or truck crane. It is important that the lifting device be able to vary and control the horizontal angle of the elongated arbor.

Disclosed, then, is an elongate arbor for mounting a wheel or wheel/tire combination onto an axle of a vehicle. One of the axle hub or the wheel bears threaded studs and the other bears tapped holes. The elongate arbor is terminated at one end with elongate fork tubes and at the opposite end with a flange having a plurality of apertures, says 3 apertures. The wheel to be mounted has tapped holes created to match the arbor flange apertures for mounting the wheel onto the arbor with threaded studs. Forks from, for example, a forklift, can be inserted into the elongate forklift tubes to lift and maneuver the arbor/wheel combination to align the wheel mounts with the axle mounts and threaded studs inserted for securement. The large wheel now can be mounted to axle hub of the vehicle.

BRIEF DESCRIPTION OF THE DRAWINGS

For a fuller understanding of the nature and advantages of the present media and process, reference should be had to the following detailed description taken in connection with the accompanying drawings, in which:

FIG. 1 is a is a side view of combine (or harvester) depicted in commonly-assigned U.S. Pat. No. 8,286,984 and which has large wheels;

FIG. 2 is a side view of a tire mounted on a large wheel like the wheels for the combine depicted in FIG. 1;

FIG. 3 is a sectional view taken along line 3-3 in FIG. 2;

The drawings will be described in greater detail below.

DETAILED DESCRIPTION

The subject of an articulated harvester also is disclosed in U.S. Pat. Nos. 4,317,326, 4,428,182, 6,012,272, 6,125,618, 6,339,917, 6,604,351, 6,606,844, 6,604,995, 6,604,350, 6,484,485, 6,612,101, 6,233,911, 6,240,711, and 6,167,982. A harvester/grain cart combination can be converted to an "articulated" combine as disclosed in U.S. Pat. No. 6,910, 845. Various grain handling and grain unloading techniques are disclosed in U.S. Pat. Nos. 7,143,863 and 7,198,449. The disclosures of these patents are expressly incorporated herein by reference. Each of the combines and grain carts in these and similar patents contain large wheels that are particularly difficult to mount. Additional vehicles having large, difficult to mount wheels include vehicles typical in the agricultural, mining, and construction industries, such as, for example, cranes, trucks, tractors, combines, sprayers, large earth moving vehicles, excavators, and the like.

Referring initially to FIG. 1, an articulated combine, 10, is shown having, among others, a tired wheel, 12. For a detailed description of combine 10, reference is made to U.S. Pat. No.

8,286,984, cited above. Of current interest in tired wheel 12 depicted in greater detail in FIG. 1. In particular, a tire, 14, is seen mounted on a wheel, 16. The wheel has a nominal diameter of 32 inches, making it a large wheel. Large wheels, for present purposes, generally range from about 24 to about 60 inches and larger (tire diameters of, say, about 60 inches to about 120 inches). While smaller wheels can be mounted by the disclosed arbor, their smaller size is more amenable to other means of mounting including hand mounting. Wheel 16 is seen in cross-sectional view in FIG. 3.

Figure 4:
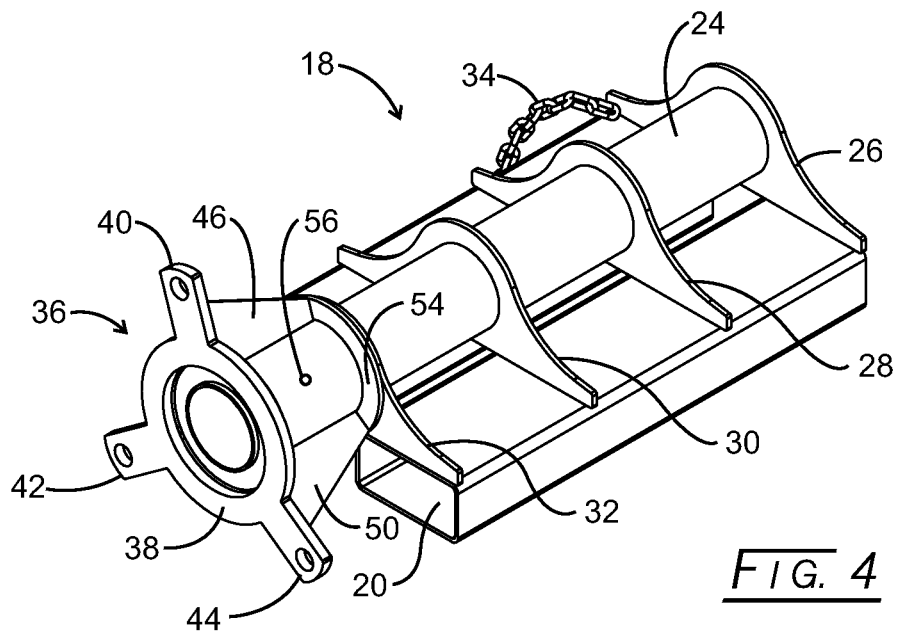
FIG. 4 is a rear view of the combine in FIG. 1 showing a forklift moving the arbor mounted tired wheel into position of its mounting to the combine.
Figure 5:
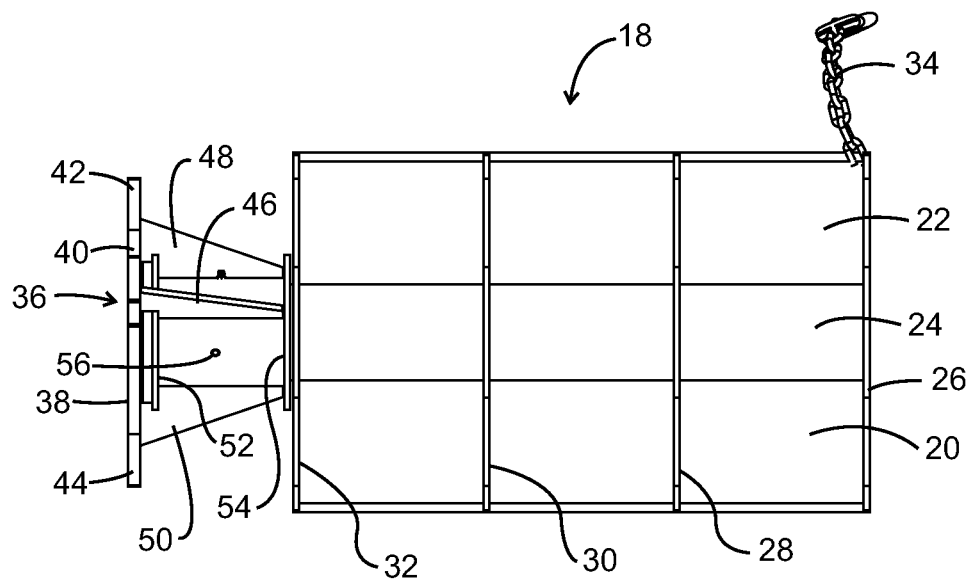
FIG. 5 is an isometric view of the novel arbor.

An arbor, 18, is shown in isometric view in FIG. 4. The proximal end has a pair of elongate fork tubes, such as a fork tubes, 20 and 22 (see FIG. 5), into which forks on a, for example, forklift, backhoe, tractor loader, or truck crane, for lifting and moving arbor 18 into position for its attachment to wheel 16 and mounting to combine 10.

Arbor 18 additionally has an inner tube, 24, running between and above fork tubes, 20 and 22. Flanges, 26, 28, 30, and 32 attach inner tube 24 to fork tubes 20 and 22. A chain, 34, is attached to the proximal end of tube 22.

The distal end of arbor 18 caries a tire loader head, 36, terminated at its distal end with an outer flange, 38, having 3 outwardly projecting arms, 40, 42, and 44, each projecting arm having an aperture about its end. Each projecting 40, 42, and 44 arm is supported by a supporting gussets, 46, 48 and 50, respectively. Behind and supporting outer flange 38 is an inner annular plate, 52, that goes around inner tube 24. An annular supporting flange, 54, mounts against flange 40, 42, and 44. Tube 24 at its distal end contains a zerk, 56.

Figure 6:
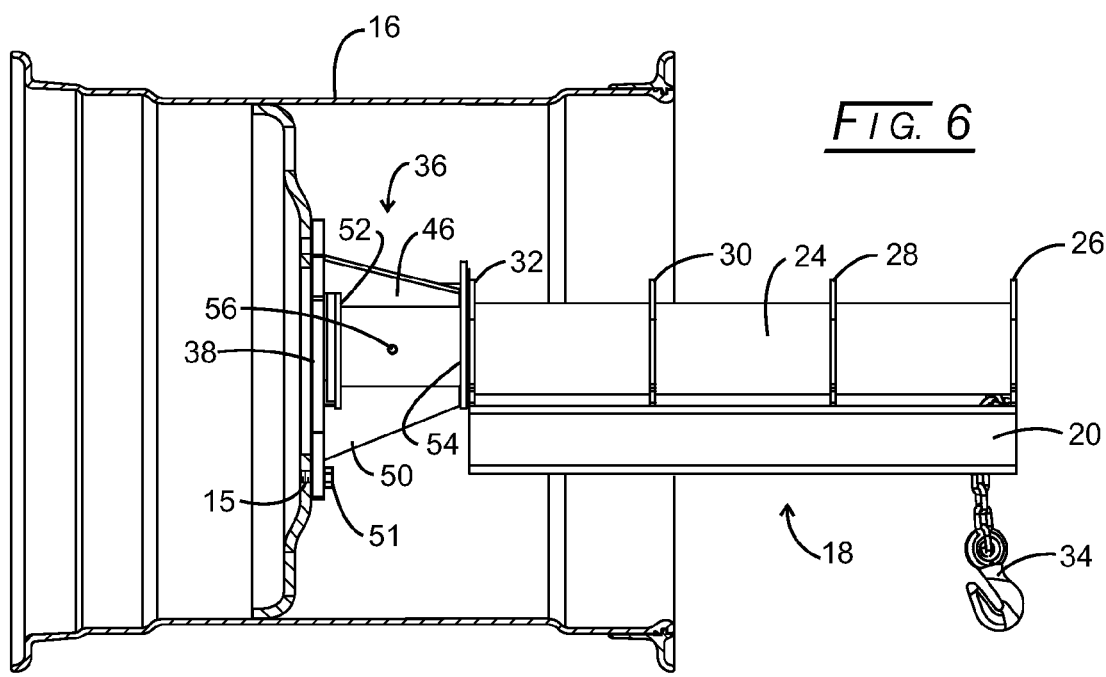
FIG. 6 is an overhead view of the arbor in FIG. 5.
Figure 7:
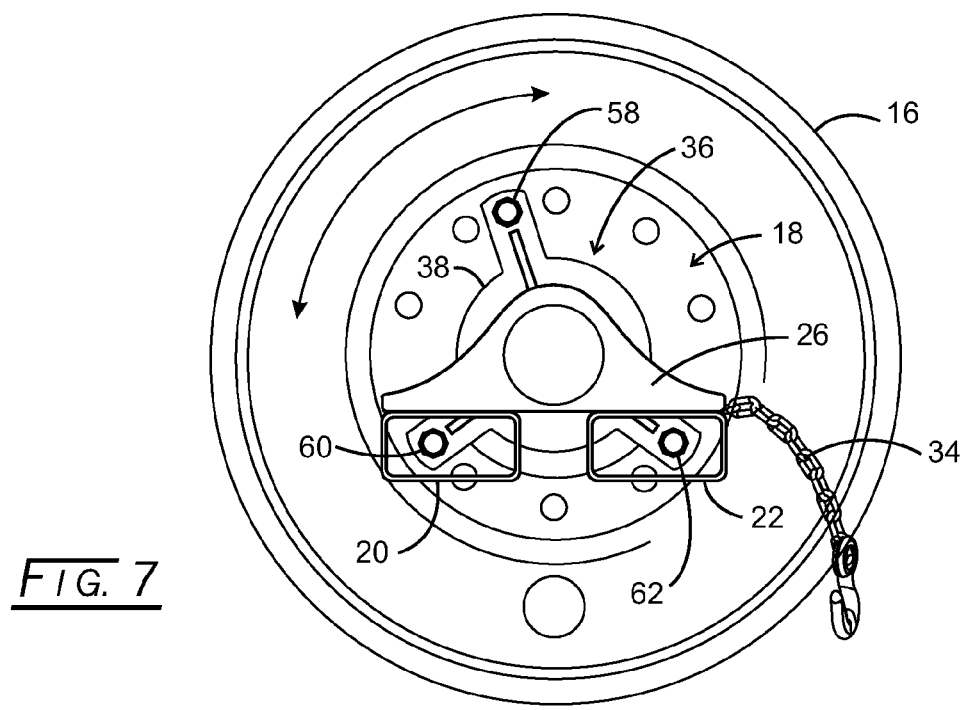
FIG. 7 is a side view of the arbor mounted tired wheel of FIG. 4 with the wheel cut-away to reveal the arbor.

Referring now to FIGS. 6 and 7, arbor 18 is seen attached to wheel 16 using pins 58, 60, and 62, that have been inserted through the apertures in outwardly projecting arms, 40, 42, and 44. Such pins may be tapered. In order to use this mode of attachment, three holes, 11, 13, and 15 (FIG. 2) were drilled into wheel 16 at locations between the wheel lugholes. The wheel to be mounted may also have tapped holes created to match the arbor flange apertures for mounting the wheel onto the arbor with threaded studs 51. It will be appreciated that arbor 18 could have more or less than 3 arms form its attachment to wheel 16. Weight of wheel 16 and other considerations determine whether 2, 3, or more arms are required. If only 2 arms are used, then should be more than 90° apart.

Figure 8:
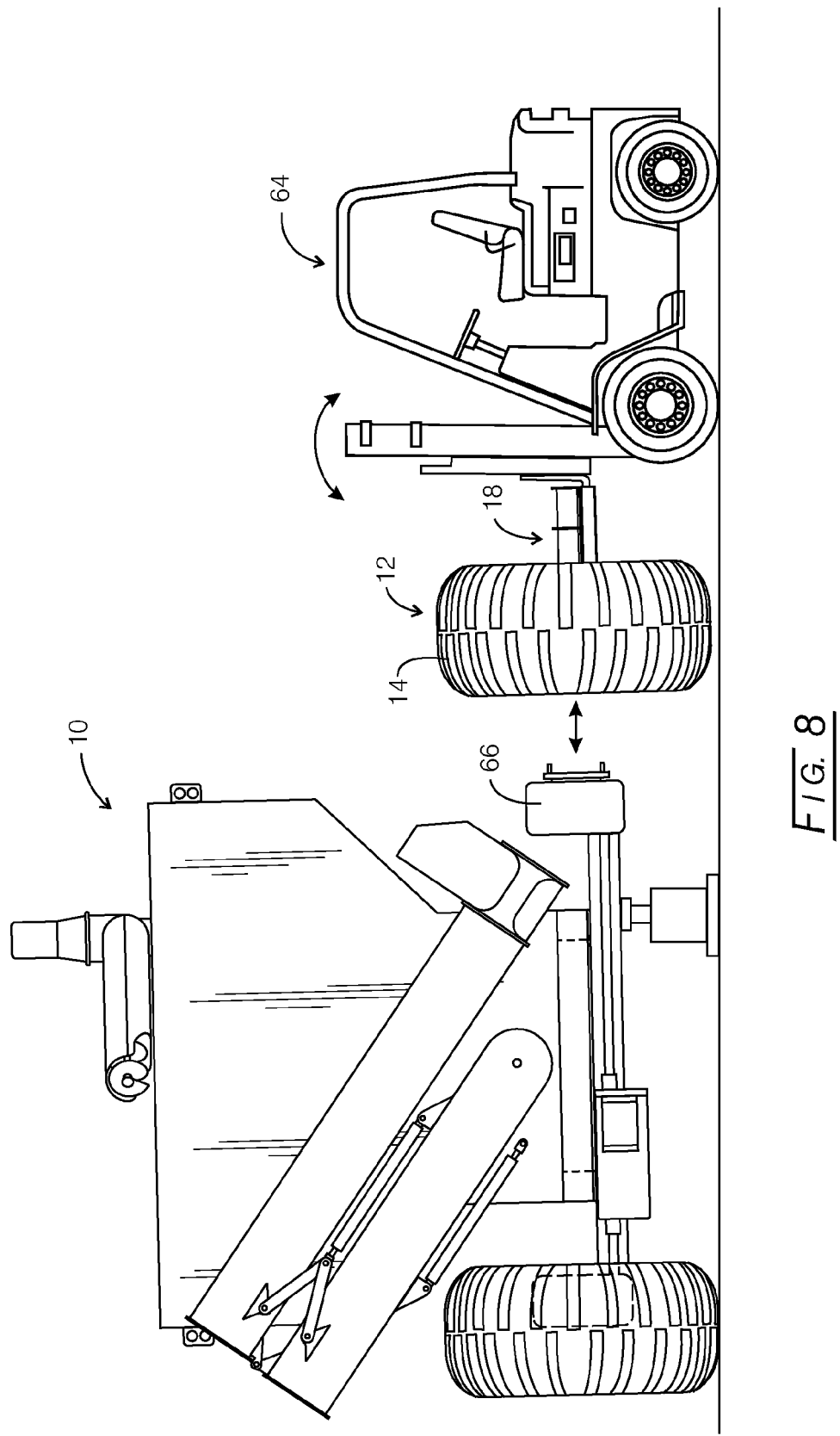
FIG. 8 is a rear view of the arbor mounted tired wheel of FIG. 7.

In FIG. 8, a forklift, has lifted the arbor/wheel combination of FIGS. 6 and 7 and is moving towards combine 10 to mount wheel 16 onto an axle hub, 66, that contains outwardly projecting threaded studs that fit through the holes in wheel 16 for its mounting. Demounting of wheel 16 is accomplished in the reverse manner using arbor 18.

While the device and method have been described with reference to various embodiments, those skilled in the art will understand that various changes may be made and equivalents may be substituted for elements thereof without departing from the scope and essence of the disclosure. In addition, many modifications may be made to adapt a particular situation or material to the teachings of the disclosure without departing from the essential scope thereof. Therefore, it is intended that the disclosure not be limited to the particular embodiments disclosed, but that the disclosure will include all embodiments falling within the scope of the appended claims. In this application all units are in the metric system and all amounts and percentages are by weight, unless otherwise expressly indicated. Also, all citations referred herein are expressly incorporated herein by reference.

I claim:

1. An elongate arbor for mounting a large wheel onto an axle hub of a vehicle, the large wheel having tapped holes created between mounting holes, which comprises:
   the elongate arbor having a proximal end and a distal end;
   (a) the elongate arbor proximal end being terminated with elongate fork tubes; and
   (b) the distal end terminated with a rotatable flange having a plurality of apertures that match tapped holes created in the large wheel;
   the elongate arbor further having a central tube and a plurality of flanges carried thereby and supporting said elongate fork tubes, said central tube having a zerk at its distal end;
   the arbor being configured to have forks inserted into the elongate fork tubes for lifting and maneuvering the flange apertures into alignment with the large wheel tapped holes for insertion of a threaded stud to secure the large wheel onto the elongate arbor.

2. The elongate arbor of claim 1, wherein distal end flange has 3 apertures.

3. The elongate arbor of claim 2, wherein the distal end rotatable flange comprises 3 outwardly projecting arms having said plurality of apertures.

4. The elongate arbor of claim 1, wherein the distal end rotatable flange comprises 3 outwardly projecting arms having said plurality of apertures.

5. The elongate arbor of claim 1, wherein supporting gussets are mounted behind said outwardly projecting arms.

6. The elongate arbor of claim 1, which carries a chain at its proximal end.

7. In combination, the elongate arbor of claim 1 and a large wheel having tapped holes that match the plurality of apertures in said rotatable flange.

8. A method for mounting a large wheel onto an axle hub of a vehicle, which comprises the steps of:
   (a) creating tapped holes in said large wheel between mounting holes;
   (b) providing an elongate arbor having a proximal end and a distal end;
      (i) the elongate arbor proximal end being terminated with elongate fork tubes; and
      (ii) the distal end being terminated with a rotatable flange having a plurality of apertures that match the tapped holes created in the large wheel;
   (c) inserting forks into the elongate fork tubes for lifting and maneuvering the rotatable flange apertures into alignment with the large wheel tapped holes;
   (d) inserting threaded studs into the aligned flange apertures and the large wheel tapped holes to secure the large wheel onto the elongate arbor; and
   (e) mounting said large wheel onto said axle hub using another set of threaded studs.

9. The method of claim 8, wherein distal end flange is provided with 3 apertures.

10. The method of claim 9, wherein the distal end rotatable flange is provided with 3 outwardly projecting arms having said plurality of apertures.

11. The method of claim 10, wherein the elongate arbor is provided with a central tube and a plurality of flanges carried thereby and supporting said elongate fork tubes, said central tube having a zerk at its distal end.

12. The method of claim 8, wherein the distal end rotatable flange is provided with 3 outwardly projecting arms having said plurality of apertures.

13. The method of claim 8, wherein supporting gussets are provided to mount behind said outwardly projecting arms.

14. The method of claim 8, wherein the elongate arbor is provided with a central tube and a plurality of flanges carried thereby and supporting said elongate fork tubes, said central tube having a zerk at its distal end.

15. The method of claim 8, wherein the elongate arbor is provided with a chain at its proximal end.

\* \* \* \* \*